Aug. 9, 1927.
H. L. WHITTEMORE
1,638,425
STRAIN GAUGE
Filed Dec. 10, 1925
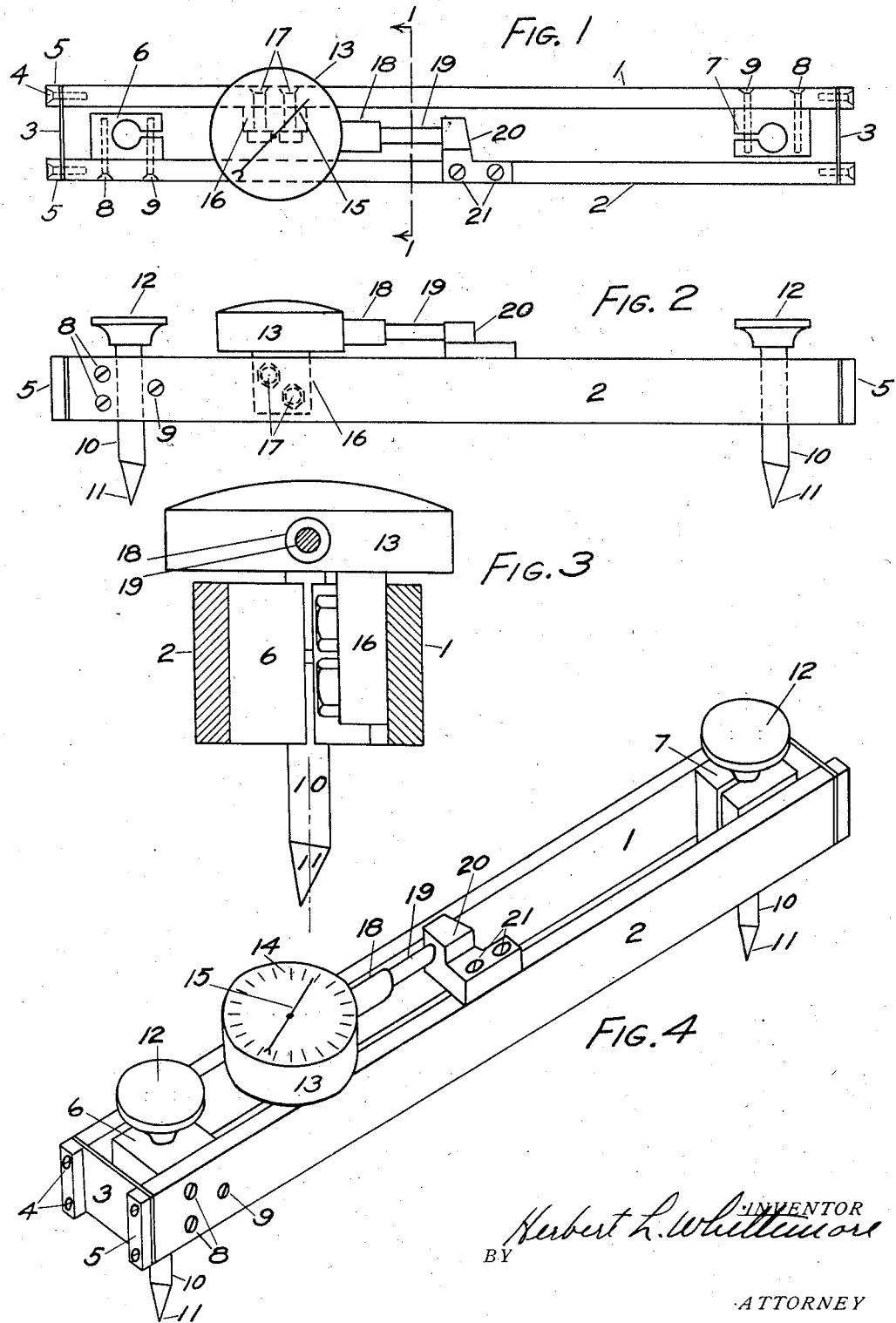

Patented Aug. 9, 1927.

1,638,425

UNITED STATES PATENT OFFICE.

HERBERT L. WHITTEMORE, OF WASHINGTON, DISTRICT OF COLUMBIA.

STRAIN GAUGE.

Application filed December 10, 1925. Serial No. 74,516.

My invention relates to strain gauges for measuring the elongation or contraction of a gauge-length on the surface of a structural member such as a wall, test specimen, column or beam, and thereby measuring indirectly, the stress in the member.

An object of my invention is to provide an easily portable strain gauge which may be used to measure accurately small changes in the gauge-length. Further objects of my invention are to provide a gauge which is rugged in construction and with which readings may be easily and quickly obtained.

In the accompanying drawings, Figure 1 is a plan view of the gauge with its pins 10 removed, Figure 2 is a side elevation of the assembled gauge, Figure 3 is a sectional elevation along the line 1—1, and Figure 4 is a perspective view of the gauge.

The main frame of the gauge consists of the two bars 1 and 2, preferably of invar steel which does not change in length when its temperature changes, and the two thin flexible plates 3 which are preferably of tempered spring steel, and are fastened to the bars 1 and 2 by caps 5 and screws 4. The pin clamps 6 and 7 are screwed to the bars 2 and 1 respectively, each by means of screws 8. A pin 10 is rotatably mounted in each of the pin-clamps 6 and 7, and may be clamped rigidly by means of the screw 9. Each of the pins 10 has a conical point 11, adapted to fit into a gauge hole in the structural member, the point 11 being preferably very slightly offset from the axis of the pin, as shown in Figure 3.

By a rotary movement of one or both of the pins 10, the distance between points 11 may be changed slightly, thus admitting of some adjustment of the distance between points 11, or gauge-length. The knobs 12 at the tops of the pins 10 may be pressed by the operator to seat the pin points 11 in gauge holes in the member to be tested.

13 represents a dial micrometer of a common type, provided with a dial 14, pointer 15, sleeve 18, and operating spindle 19 normally extended from but yieldingly movable into the sleeve 18 and dial micrometer 13. The dial micrometer 13 is firmly bolted through its downwardly extending lug 16 to the bar 1 by bolts 17.

The operating spindle 19 abuts with a slight force against the abutment block 20 which is rigidly screwed to the bar 2 with screws 21. A slight motion of the abutment block 20 relative to the dial micrometer 13 causes the operating spindle 19 to move into or out from the sleeve 18 and dial micrometer 13, and rotates the pointer 15 proportionally, and in a direction corresponding to the relative motion of the abutment block 20 to the dial micrometer 13.

The stress in structural members varies from place to place depending upon the load which is supported. As most structural materials follow Hooke's law, at least approximately, when subjected to external forces, the change in stress at any place on the surface of the member may be measured by observing the change in a gauge-length at that place. The reading of the gauge is recorded when there is no load on the member, then after each load is applied. It is usual to lay off a great many gauge-lines on a structure, use the strain gauge to read the gauge-lengths one after the other for that load, and then repeat the series of readings for the next load, carrying the same strain gauge from one point to the next.

To obtain a reading, the pin points 11 of the strain gauge are inserted into the gauge holes and held in position by the operator who presses lightly on the knobs 12. The thin plates 3 permit one bar to move longitudinally with relation to the other bar but prevent other distortion of the gauge. The relative motion of the pin points 11 is transmitted through the pins 10 and the pin clamps 7 and 6 to the bars 1 and 2 respectively, which move accurately parallel to each other for any change in the gauge length within the capacity of the instrument. The motion of the bar 1 is imparted to the body of the dial micrometer 13 which is rigidly secured to the bar 1. The motion of the bar 2 is imparted to the spindle 19 of the dial micrometer 13, through the abutment block 20 attached to the bar 2. Thus, the relative motion of the bars 1 and 2, which is equal to the relative motion of the pin points 11, is indicated on the dial 14 of the dial micrometer 13 by the pointer 15. The change in the length of any gauge-line on the member may, therefore, be obtained.

Due to the arrangement of the thin plates 3, they are not called upon to withstand any very considerable compressive force, and hence do not become buckled. The rugged construction of the frame prevents any distortion of the gauge except the bending of the two plates 3 and consequent parallel longitudinal movement of the bars 1 and 2.

It has been found that very accurate readings can be obtained quickly even with an inexperienced operator, and that different operators can obtain the same readings.

I claim:

1. A strain gauge comprising a rectangular frame formed of two parallel bars, spring means for securing the bars together, a measuring device secured to one of said bars, means on the other bar for operating said measuring device, and a pin on each bar to engage the member to be tested.

2. A strain gauge comprising a rectangular frame formed of two parallel bars and two plate springs securing said bars together, a measuring device secured to one of said bars and having an operating member, means on the other bar for engaging the operating member and a pin on each bar to engage the member to be tested.

3. A strain gauge comprising a frame formed of two bars, elastically deformable members connecting the bars, means for measuring the movement of one bar relatively to the other bar, and means on each bar to engage the member to be tested.

4. A strain gauge comprising a frame formed of two substantially parallel bars, two plate springs which allow longitudinal movement of one bar relative to the other, means for measuring the said movement and means on each bar to engage the member to be tested.

HERBERT L. WHITTEMORE.